United States Patent
Lai et al.

(10) Patent No.: US 11,815,359 B2
(45) Date of Patent: Nov. 14, 2023

(54) METHOD, DEVICE AND SYSTEM FOR PROCESSING POSITIONING INFORMATION

(71) Applicant: Bayerische Motoren Werke Aktiengesellschaft, Munich (DE)

(72) Inventors: Sam Lai, Shanghai (CN); Andy Liao, Shanghai (CN)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 1 day.

(21) Appl. No.: 17/263,444

(22) PCT Filed: Jul. 17, 2019

(86) PCT No.: PCT/EP2019/069193
§ 371 (c)(1),
(2) Date: Jan. 26, 2021

(87) PCT Pub. No.: WO2020/020712
PCT Pub. Date: Jan. 30, 2020

(65) Prior Publication Data
US 2021/0285782 A1    Sep. 16, 2021

(30) Foreign Application Priority Data

Jul. 27, 2018 (CN) .......................... 201810838314.7

(51) Int. Cl.
*G01C 21/36* (2006.01)
*G01C 21/34* (2006.01)

(52) U.S. Cl.
CPC ..... *G01C 21/3602* (2013.01); *G01C 21/3438* (2013.01); *G01C 21/3623* (2013.01)

(58) Field of Classification Search
CPC ............ G01C 21/3602; G01C 21/3438; G01C 21/3623
See application file for complete search history.

(56) References Cited

U.S. PATENT DOCUMENTS

2011/0300876 A1* 12/2011 Lee .................... G01C 21/3438
455/566
2012/0300089 A1* 11/2012 Sbaiz ..................... G06V 20/70
348/222.1

(Continued)

FOREIGN PATENT DOCUMENTS

DE        102016124123 A1 *  6/2018 ......... G06K 9/00791

OTHER PUBLICATIONS

DE_102016124123_machine_translation (Year: 2018).*

(Continued)

*Primary Examiner* — Anne Marie Antonucci
*Assistant Examiner* — Patrick M Brady
(74) *Attorney, Agent, or Firm* — Crowell & Moring LLP (57) ABSTRACT

A travel service system makes it possible for a driver to pick up a passenger quickly and accurately. The system obtains map information including real-scene picture information, determines a geographic coordinate, obtains a real-scene picture of the geographic coordinate, and analyzes the real-scene picture to identify a salient object in the real-scene picture. A preferable target position is determined on the basis of the identified salient object. The identified salient object and the preferable target position on the real-scene picture are marked. The real-scene picture with the marked salient object and the preferable marked target position are sent to a receiving terminal.

18 Claims, 4 Drawing Sheets

(56) References Cited

U.S. PATENT DOCUMENTS

| | | | |
|---|---|---|---|
| 2015/0022555 A1* | 1/2015 | Chau | G09G 5/377 |
| | | | 345/635 |
| 2015/0153188 A1* | 6/2015 | Ogale | G01C 21/3602 |
| | | | 382/113 |
| 2017/0083762 A1* | 3/2017 | Segalovitz | G06T 3/4007 |
| 2018/0058876 A1* | 3/2018 | Xie | G01C 21/3644 |
| 2018/0202822 A1* | 7/2018 | DeLizio | B60R 25/24 |

OTHER PUBLICATIONS

Singh, C. H. H. Chu and M. A. Pratt, "Visually salient features for highway scene analysis," 2015 14th IAPR International Conference on Machine Vision Applications (MVA), Tokyo, Japan, 2015, pp. 357-360, doi: 10.1109/MVA.2015.7153204 (Year: 2015).*

International Search Report (PCT/ISA/210) issued in PCT Application No. PCT/EP2019/069193 dated Nov. 11, 2019 (three (3) pages).

Written Opinion (PCT/ISA/237) issued in PCT Application No. PCT/EP2019/069193 dated Nov. 11, 2019 (ten (10) pages).

\* cited by examiner

METHOD, DEVICE AND SYSTEM FOR PROCESSING POSITIONING INFORMATION

TECHNICAL FIELD

The present subject matter relates to a method, a device and a system for processing positioning information. Specifically, various embodiments of the present disclosure may relate to a method, a device, and a system for accurately marking locations.

BACKGROUND AND SUMMARY OF THE INVENTION

With the popularity of smart devices and the development of mobile Internet, the taxi hailing platform software has been rapidly developed. Accordingly, the problem of information unbalance between taxi drivers and passengers is solved. At the same time, the cab-hailing software has also changed traditional cab-hailing manners. Compared with the traditional telephone cab-hailing and roadside cab-hailing, by utilizing the characteristics of the mobile Internet, the cab-hailing software optimizes a cab-hailing experience of passengers, changes traditional passenger awaiting manners of taxis drivers, and reduces an empty rate.

However, after a passenger makes an order, new challenges are brought for how a driver rapidly picks up the passenger. Currently, the driver may know an approximate location of the passenger according to the positioning information of smart navigation, but the location is often not accurate enough. For example, the driver does not know whether the passenger is at a south gate or a north gate of a building, and furthermore, there is a certain deviation for the positioning of navigation. Therefore, it is often difficult for the driver to find the passenger only with a simple address after positioning. Even if the driver is very close to the passenger in some cases, they cannot find each other.

In the process of implementing the embodiments of the present subject matter, the inventor finds that the prior art is at least present with the following problems:

Drivers and passengers have different expressions and understandings of the same locations Generally speaking, drivers are familiar with road names and landmark buildings, while passengers tend to have more detailed and accurate formulations, such as apartment numbers, business names, and the like. This results in that it is difficult for the drivers to understand the locations formulated by the passengers, which directly affects the positioning accuracy. If the passengers or the drivers are required to formulate extremely exact and detailed description of positioning for the locations, it is necessary for them to input substantial information, including a city, a district, a road, a number, a building name, a business name, a specific exit of a building and the like. However, with excessively redundant information, it is often not only impossible to make the positioning clearer, but also to occupy the time and effort of both parties. Moreover, excessive information may distract the driver's attention and cause a safety hazard.

Besides, the passengers do not know how to describe their specific locations during cab-hailing in a strange situation, so that the drivers cannot accurately know the location of the passengers even after confirmation by making a call. As a result, the drivers cannot find the passengers quickly after arriving at the pickup locations designated by the passengers.

How to accurately mark the pickup locations of the passengers so as to quickly and accurately pick up the passengers, is a problem to be solved now for processing the positioning information.

In order to solve at least one of problems in the prior art, a method, a device and a system for processing the positioning information are provided.

According to a first aspect of the present subject matter, there is provided a method for processing positioning information, which is preferably performed in a travel service system, characterized in that, the method comprises: obtaining map information including real-scene picture information; determining a geographic coordinate; obtaining a real-scene picture of the geographic coordinate; analyzing the real-scene picture to identify a salient object in the real-scene picture; preferably determining a target position on the basis of the identified salient object, wherein preferably the target position is the same as a position of the identified salient object or has a determined azimuth deviation from the position of the identified salient object; marking the identified salient object and optionally the target position on the real-scene picture; and sending a receiving terminal the real-scene picture with the marked salient object and the optional target position, preferably sending from a travel service system server to a passenger terminal and/or a travel service terminal, or preferably sending from the passenger terminal to the travel service terminal when the steps of the method are performed at the passenger terminal, or preferably sending from the travel service terminal to the passenger terminal when the steps of the method are performed at the travel service terminal. It is also possible that the steps of the method are performed collaboratively in two or three of the server, the passenger terminal and the travel service terminal. In a preferable solution, one of the server, the passenger terminal and the travel service terminal may serve as a sending terminal, and the other one or the other two of the server, the passenger terminal and the travel service terminal may serve as a receiving terminal.

According to a preferable solution of the present subject matter, when the travel service system processes a passenger order, the corresponding map data is first obtained. The obtained map data includes data of a street view map. The so-called street view map consists in real-scene pictures of the street, and panoramic pictures of the street for 360° in the horizontal direction and for 180° in the vertical direction may be provided. Therefore, the users can observe the street on the ground and the scenery on both sides thereof at the selected positioning coordinate through the street view map.

It is particularly advantageous that, after determining a positioning coordinate of a pickup location on the basis of the positioning information of the passenger and of the vehicle, a real-scene picture of the coordinate may be read from the map data according to the coordinate of the pickup location. The positioning coordinate of the pickup location can only convey an approximate positioning position of the location, but the real-scene picture of the geographical coordinate contains very rich information, including prominent signs such as traffic signs, road signs, business or building signs, and the like. Then, by using image processing and analyzing methods such as Salient Area Detection, a salient object in the obtained real-scene picture may be marked, and the location and the area of the salient object in the real-scene picture may be positioned. The salient object is then marked in the real-scene picture (e.g., processing by highlighting the area of the salient object). The real-scene picture with the marked salient object is then sent to a passenger terminal and/or a taxi driver.

Therefore, according to an advantageous solution of the present subject matter, after determining the pickup location positioning information, the salient object in the real scene may be automatically found from the real-scene picture as a precise positioning description of the pickup location. The passenger terminal and the driver at the travel service terminal may quickly and clearly understand the position of the specific pickup location on the basis of the salient object such as the highlighted road traffic sign, business or building sign in the received real-scene picture. In addition, with the use of the marking in the real-scene picture, the positioning information is simple and clear, thereby the communication cost between the driver and the passenger can be saved, and it can be avoided that the driver is distracted and hence a safety hazard by excessive text messages is brought.

The method according to the present subject matter and the device which will be explained in more detail below, may be used especially in travel service systems such as internet cab-hailing platforms. However, they may also be applied in other fields, such as the determination of a meeting location between a person and another, or used for guiding pedestrians to travel along a predetermined travel route.

One or more salient objects in the real-scene picture may be marked when the real-scene picture is analyzed. It is possible to choose an optimal salient object from them, or it is possible to use two or more salient objects jointly.

When the target position is determined, it is possible that, the target position is the same as the position of the identified salient object. In other words, the position of the identified salient object serves as the target position. In the travel service, the passenger and the driver may converge at the location of the salient object or the target position. It is also possible that the target position has a determined azimuth deviation from the position of the identified salient object. For example, when the location of the identified salient object does not conform to the traffic rules as the target position, but a neighboring location several meters away conforms to the traffic rules, the neighboring location may serve as the target position. Another example is the following case: in hot weather, the location of the identified salient object is uncomfortable for the passenger as the target position, but a neighboring location has a sun-shielding tree or a sun-shielding tent, and thus is more comfortable for the passenger. In this case, the neighboring location may serve as the target position. In this case, it is particularly advantageous to additionally mark in the real-scene picture, for example an arrow or another guiding symbol from the position of the identified salient object to the target position may be used, and as an alternative or a supplement, a guiding literal description may also be added.

It is possible that, the identification of the salient object and the determination of the target position may be performed by the server of the travel service system, and the identified salient object and the target position may be sent to the passenger terminal and/or the travel service terminal. It is further possible that, the server selects and recommends an optimal salient object and an optimal target position according to predetermined rules. It is also possible that, the server provides a plurality of possible salient objects and a plurality of target positions, and the passenger terminal or the travel service terminal selects an optimal salient object and an optimal target position for the passenger or the travel service terminal itself, and then provides the same to the partner. The predetermined rules may comprise: for example, the shortest walking distance of the passenger to the target position, the least expected cost, or the shortest time or the most unobstructed traffic to arrive at the passenger's destination from the target position, and the like. Furthermore, it is possible that, the identification of the salient object and the determination of the target position may be performed by the passenger terminal, and the identified salient object and the target position may be provided to the travel service terminal either directly from the passenger terminal or indirectly via the server. It is also possible that, the identification of the salient object and the determination of the target position may be performed by the travel service terminal, and the identified salient object and the target position may be provided to the passenger terminal either directly from the travel service terminal or indirectly via the server.

Optionally, prior to the step of "obtaining map information including real-scene picture information", the method further comprises:

receiving demand information and positioning information of a passenger terminal from the passenger terminal;

matching a travel service terminal according to the positioning information of the passenger terminal, and sending the demand information of the user to the travel service terminal; and receiving confirmation information and positioning information of the travel service terminal from the travel service terminal.

Optionally, said demand information includes destination information.

Optionally, the step of "determining a geographic coordinate" further includes: determining a geographic coordinate on the basis of the positioning information of the passenger terminal and/or the positioning information of the travel service terminal.

Optionally, the method further comprises: sending the geographic coordinate to the receiving terminal.

According to a second aspect of the present subject matter, there is provided a device for processing positioning information, which is preferably used in a travel service system, characterized in that, the device comprises: a map module for obtaining map information including real-scene picture information; a coordinate module for determining a geographic coordinate; a real-scene picture module for obtaining information of a real-scene picture of the geographic coordinate; an image analyzing module for analyzing the real-scene picture to identify a salient object in the real-scene picture; preferably a target position determining module for determining a target position which preferably is the same as a position of the identified salient object or has a determined azimuth deviation from the identified salient object; and a marking module for marking the identified salient object and the preferable target position on the real-scene picture; and a sending module for sending to a receiving terminal a real-scene picture on which the salient object and the preferable object are marked, and preferably for sending from the server to the passenger terminal and/or the travel service terminal, or preferably for sending from the passenger terminal to the travel service terminal, or preferably for sending from the travel service terminal to the passenger terminal.

Optionally, said device further comprises: a passenger terminal information module for receiving demand information and positioning information of a passenger terminal from the passenger terminal; a matching module for matching a travel service terminal according to the positioning information of the passenger terminal, and sending demand information of the user to the travel service terminal; and a travel service terminal information module for receiving confirmation information and positioning information of the travel service terminal from the travel service terminal.

Optionally, said demand information includes destination information.

Optionally, said coordinate module is further configured for determining a geographic coordinate on the basis of the positioning information of the passenger terminal and/or the positioning information of the travel service terminal.

Optionally, the sending module is further configured for sending the geographic coordinate to the receiving terminal.

According to a third aspect of the present subject matter, there is provided a system for processing positioning information, especially a travel service system, characterized in that, the system comprises the device for processing positioning information according to the present subject matter, wherein the device is connectable in communication to at least one user terminal, and especially connectable in communication via a mobile wireless network. As having been described previously, such a system is especially suitable as a travel service system, but the present subject matter is not limited thereto, for example application in a dating between a person and another, providing path guidance for pedestrians and so on.

According to an advantageous solution of the present subject matter, it is possible to automatically find a salient object in real scene from a real-scene picture as an accurate positioning description of a pickup location. The driver may quickly and clearly learn about a position of the specific pickup location according to a salient object such as the highlighted road traffic sign, the business or building sign in the received real-scene picture. With the use of the marking in the real-scene picture, the positioning information is simple and clear, thereby the communication cost between the driver and the passenger can be saved. Further, in the entire process, neither input of instructions by the user nor manual operation is necessary. It brings great convenience to the user and also improves safe driving of the driver.

According to another aspect of the present subject matter, there is provided a data processing device, comprising:
- a memory in which computer executable instructions are stored; and
- a processor, which is configured to execute the computer executable instructions, wherein the processor implements the method according to the present subject matter when executing the instructions.

According to another aspect of the present subject matter, there is provided a non-transitory computer readable storage medium, in which computer executable instructions are stored, wherein the method according to the present subject matter is carried out when the instructions are executed by a processor.

Embodiments of the present subject matter may be implemented in hardware or in software, depending on the determined implementation needs. The implementations may be carried out in the case of using a digital storage medium such as a floppy disk, DVD, Blue-ray Disc, CD, ROM, PROM, EPROM, EEPROM or flash memory, solid state drive or other magnetic or optical memories. The digital storage medium is stored with an electronically readable control signal, which may be in such cooperative function with a programmable hardware assembly so as to implement a corresponding method.

The processor may include a central processing unit (CPU=Central Processing Unit), a graphics processing unit (GPU=Graphics Processing Unit), an application-specific integrated circuit (ASIC=Application-Specific Integrated Circuit), an integrated circuit (IC=Integrated Circuit), a system on chip (SOC=System on Chip), a programmable logic element or a field programmable gate array (FPGA=Field Programmable Gate Array) with a microprocessor.

Thus, the non-transitory computer readable storage medium may be machine readable or computer readable. Accordingly, in some embodiments, the computer readable storage medium includes a data carrier having executable instructions that are capable of such cooperative function with a programmable computer system or a programmable hardware assembly, such as to implement one of the methods described here. Thus, one embodiment is a data carrier, a digital storage medium or a computer readable storage medium, on which there is recorded a program for implementing one of the methods described herein.

The embodiments of the present subject matter may generally be implemented as a program, a firmware, a computer program, or computer program product with program codes, or as data, wherein the program codes or data effectively implements the aforementioned method when the program runs on a processor or a programmable hardware assembly. The program codes or data may, for example, also be stored on a machine readable carrier or a data carrier. Program codes or data may additionally be present as source codes, machine codes or bytecodes, and as other intermediate codes.

The technical features recited in the present application can be arbitrarily combined as long as such combinations are not contradictory to each other, and all these combinations are the technical contents recited in the present application.

BRIEF DESCRIPTION OF THE DRAWINGS

Next, the present subject matter will be explained in more detail by way of the embodiments with reference to the accompanying drawings. However, the present subject matter is not limited to the described and illustrated embodiments.

DETAILED DESCRIPTION OF THE DRAWINGS

In order to make the aforementioned object, features and advantages of the present subject matter more apparent and understandable, detailed explanations are made to the specific embodiments of the present subject matter in combination with the drawings as follows.

In the following description, specific details are set forth for an adequate understanding of the present subject matter. However, the present subject matter can be implemented in multiple manners other than those described herein, and those skilled in the art may make similar promotion without departing from the merit of present subject matter. Therefore, the present subject matter should not be construed to be limited by the specific embodiments below.

It should be understood that the term "travel service terminal" as used herein is generally associated with an operating vehicle, such as a taxi, but may also be associated with a boat or aircraft such as a flying car or the like.

Figure 1:
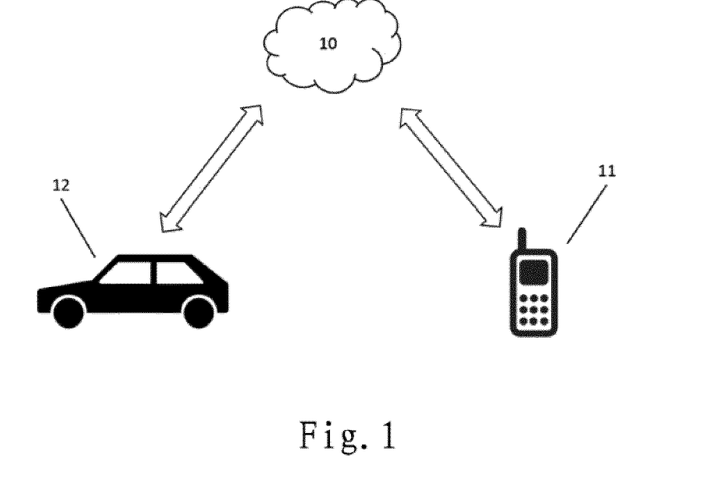
FIG. 1 is a block diagram of an example implementation environment according to an embodiment of the present subject matter.

FIG. 1 is an example block diagram for an embodiment. The passenger's smart communication tool as the passenger terminal 11 and the vehicle as the travel service terminal 12 are directly connected through a wireless communication link via a network 10 or indirectly connected for example via a travel service system. The wireless communication link may be a wireless communication network, such as a cellular network (including multiple base stations, controllers), a core network (generally including multiple switching entities and gateways), and one or more other networks, such as but not limited to Internet, Public Switched Telephone Network (PSTN), packet switched network, frame relay network, fiber optic network, and/or other types of networks.

Figure 2:
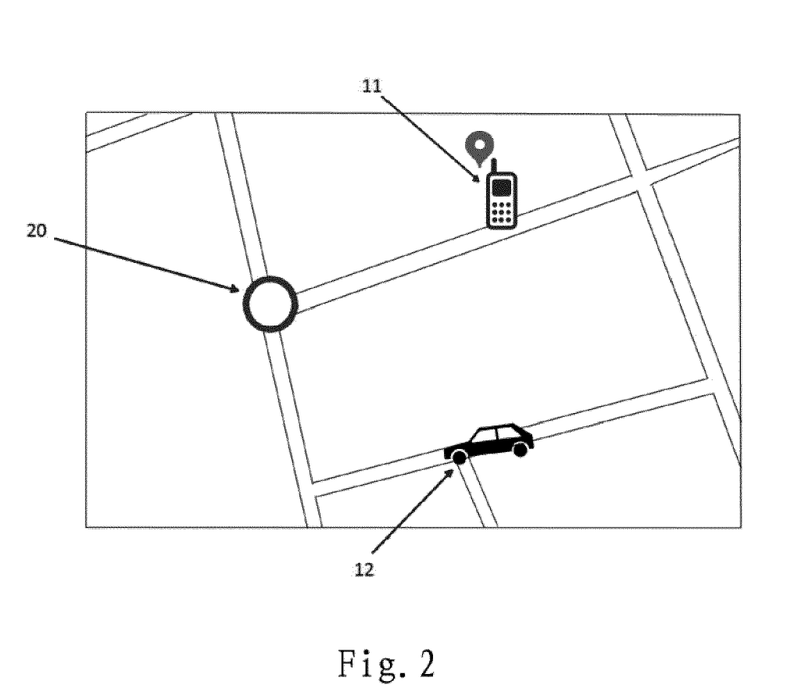
FIG. 2 is an example map according to an embodiment of the present subject matter.

FIG. 2 is an example map of an embodiment of the present subject matter. The user of the smart communication tool or the passenger terminal 11, and the vehicle or the travel service terminal 12 are respectively located at corresponding positions on the map. The cab-hailing platform system or the travel service system may determine any location 20 between them or nearby as a pickup location according to predetermined rules, and then inform the passenger terminal and the travel service terminal of the pickup location 20. However, the coordinate of the pickup location 20 is often not precise enough, for example, in the case of complex road conditions, or the driver does not know whether the passenger is at the south gate or a north gate of a building. Moreover, the positioning of navigation usually has a certain deviation, so that it is often difficult for the driver and the passenger to find each other only with the aid of a positioning address.

Figure 3:
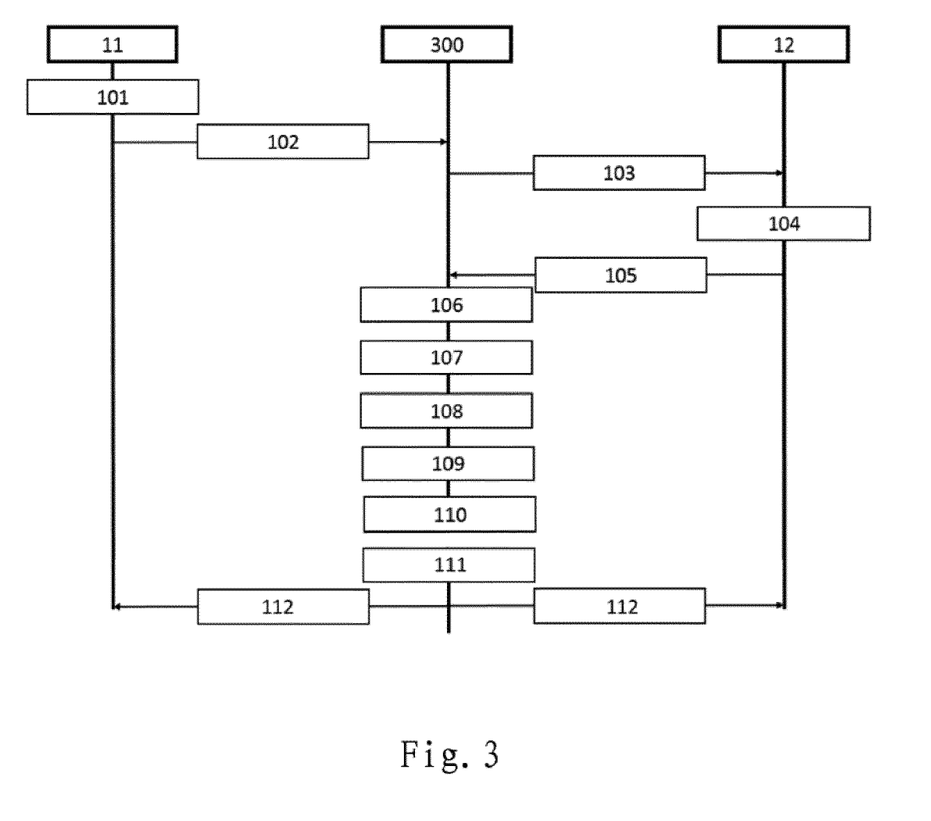
FIG. 3 is a flow chart of a method for accurately marking a position of a location according to an embodiment of the present subject matter.

FIG. 3 is a flow chart of a method for marking a position of a location according to the present subject matter. The embodiment shown in FIG. 3 is particularly suitable for application in a travel service system or an internet cab-hailing platform. Before describing FIG. 3, it should be noted that the flow chart shown herein is described by way of example with reference to the block diagram of implementation environment shown in FIG. 1, but these operation steps may be performed in any system without limitation to the scenes as shown in the above-described drawings. In addition, the flow chart in FIG. 3 shows an example of performing the operation steps in a specific order, as indicated by the lines connecting the various step blocks, but the various steps shown in the figure may be carried out in any order or in any combination or sub-combination. It should be understood that in some embodiments, some of the following steps may be combined into a single step. In some embodiments, one or more additional steps may be included.

According to the embodiment of FIG. 3 according to the present subject matter, the smart communication tool is the passenger terminal 11, the vehicle is the travel service terminal 12, and the reference number 300 represents a device for processing the positioning information. In Step 101, the passenger terminal 11 sends a cab-hailing order instruction of a user. The instruction may include information such as a starting location, a destination location, and the like.

In Step 102, the device 300 for processing the positioning information receives the cab-hailing order and the positioning information of the passenger terminal from the passenger terminal 11.

In Step 103, the device 300 for processing the positioning information finds an available vehicle in the travel service terminal (taxi driver) registered in the system on the basis of the positioning information of the passenger terminal. The device 300 for processing the positioning information may know the positioning information of the taxi driver registered in the system through the cab-hailing platform system. For example, it is possible to determine whether the vehicle is in the same area as the passenger, or calculate the distance between the travel service terminal and the passenger terminal, so as to select a matching vehicle. Then, the device 300 for processing the positioning information sends to the travel service terminal 12 the cab-hailing order received from the passenger terminal 11.

In Step 104, the travel service terminal 12 sends a driver confirmation instruction, indicating that the driver is willing to accept the cab-hailing order.

In Step 105, the device 300 for processing the positioning information receives the confirmation information and the real-time positioning coordinate of the travel service terminal (the driver accepting the order) from the travel service terminal 12.

In Step 106, the device 300 for processing positioning information obtains a map database pre-stored in the system. The map information includes real-scene picture information.

In Step 107, the device 300 for processing the positioning information determines a suitable pickup location on the basis of the obtained map data, the received confirmation information, and the real-time positioning coordinate of the travel service terminal (the driver accepting the order) and the positioning information of the passenger terminal. The pickup location may be any one location between the passenger and the vehicle or nearby. For example, the device 300 for processing positioning information may select a location where the passenger is situated as a pickup location.

As described above, the device 300 for processing positioning information may obtain a map database containing a street view map. The so-called street view map which is a real-scene picture of the street, may provide panoramic pictures of the street in the horizontal direction and the vertical direction. Therefore, the user can observe the street on the ground and the scenery on both sides of the selected positioning coordinate through the street view map.

Figure 4:
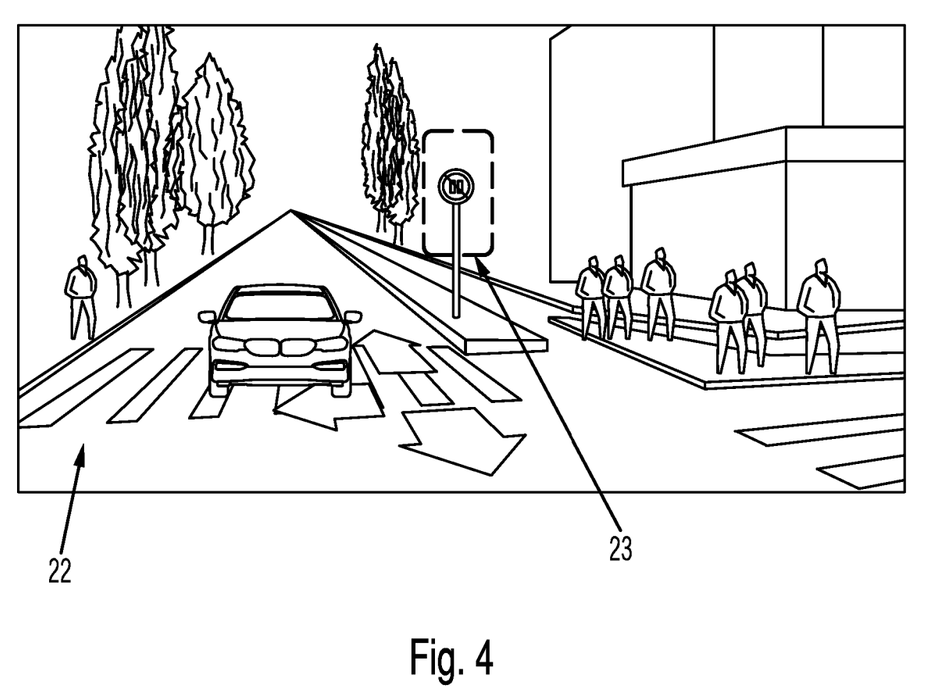
FIG. 4 is an example real-scene picture on which a salient object is exemplarily marked according to an embodiment of the present subject matter.

FIG. 4 shows an example real-scene picture. Here, the real-scene picture is a real-scene picture 22 of a crossroad, which shows objects such as streets, traffic signs, buildings, and zebra stripes.

In Step 108 as shown in FIG. 3, the device 300 for processing the positioning information obtains the real-scene picture information of the pickup location according to the geographic coordinate of the pickup location determined In Step 107, in the map database containing the real-scene picture. At this time, the real-scene picture 22 does not contain the marking 23 as shown in FIG. 4. For the marking 23, it will be described in detail later.

In Step 109, the device 300 for processing the positioning information performs a salient area analysis of the real-scene picture of the pickup location obtained in Step 108, so as to identify the position and the area of the relatively salient object in the real-scene picture. The purpose of salient area analysis and target identification is to focus on those areas attracting visual attention so that an area of a relatively salient object in the picture may be obtained by analysis when the characteristics are extracted.

A common visual salient analysis has, for example, a method on the basis of histogram contrast, wherein the salient value of each pixel is determined by its color difference with all other pixels in the image, thereby obtaining a full resolution salient image.

In a method on the basis of a local contrast, the image is first divided into small areas. The use of the division method is based on division of a graph. The basic division idea is to take each pixel point as the vertex of the undirected graph and the dissimilarity between two pixel points as the weight of the edge. It is required that the maximum weight of the edge connecting two vertices within the same area is less than the minimum weight of the edge connecting the vertices of different areas. In the iterative process, the vertex induction and the area integration are performed. The salient value of each area is determined by its spatial distances from all other areas and the color difference weighted by the number of pixels in the area. The spatial distance is the Euclidean distance between the centers of gravity of the two areas, and the farther area is assigned with a smaller weight.

The salient object in the real-scene picture obtained by analysis may serve as the pickup location, and may provide clearly the positioning information in the real environment.

In Step 110, the device 300 for processing the positioning information determines a target position on the basis of the identified salient object.

In Step 111, the device 300 for processing the positioning information marks the identified salient object and the area in which the target position is located on the real-scene picture.

First, it's assumed that the salient object marked in Step 109 is a circular traffic sign in the center of the real-scene picture. The salient object in the real-scene picture 22 is marked by a rectangular marking 23 in the real-scene picture 22 as shown in FIG. 4. The circular traffic sign in FIG. 4 is marked by a distinct rectangular frame. As an alternative or a supplement, the circular traffic sign is highlighted in the processed real-scene picture. Therefore, the passenger and the driver of the travel service terminal may clearly know the salient object in the real-scene picture by observing FIG. 4, and can easily find the object in the real environment. Of course, there are many ways of marking the salient object, which are not limited to the manner as shown in FIG. 4.

In the real-scene picture as shown in FIG. 4, the position of the circular traffic sign can serve as the actual pickup location, so that the location where the circular traffic sign is situated may directly serve as the target position. In an undescribed case, it is possible that, according to the traffic rules, the location of the circular traffic sign does not allow parking and getting on and off by the passenger, which are yet allowed at adjacent locations for example 5 meters away from the circular road signs along the road, so that the adjacent location may serve as the target position, and the target position is additionally marked by for example an arrow and/or text in the real-scene picture.

In Step 112, the device 300 for processing the positioning information sends a real-scene picture 22 with the marked salient object and the marked target position to the passenger terminal 11 and/or the travel service terminal 12. As described above, the passenger and the driver of the travel service terminal may observe the salient object with the marking 23 on the real-scene picture 22. Therefore, by means of the real-scene picture 22 of FIG. 5, both parties may easily find the object and reach the target position in the real environment. The device 300 for processing the positioning information may also send the geographic coordinate to the passenger terminal and/or the travel service terminal.

Figure 5:
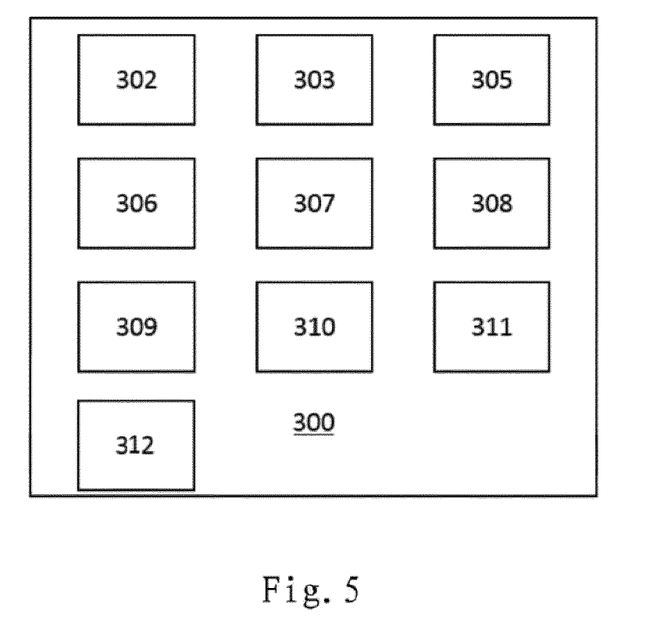
FIG. 5 is a structural block diagram of a device for accurately marking a position of a location according to an embodiment of the present subject matter.

FIG. 5 is a structural block diagram of a device for marking a position of an accurate location according to an embodiment of the present subject matter. According to the embodiment as shown in FIG. 5 of the present subject matter, the device 300 for processing the positioning information comprises: a passenger terminal information module 302 for receiving demand information and positioning information of a passenger terminal from the passenger terminal; a matching module 303 for matching a travel service terminal according to the positioning information of the passenger terminal, and sending demand information of the user to the travel service terminal; a travel service terminal information module 305 for receiving confirmation information and positioning information of the travel service terminal from the travel service terminal; a map module 306 for obtaining map information including real-scene picture information; a coordinate module 307 for determining a geographic coordinate; a real-scene picture module 308 for obtaining information of a real-scene picture of the geographic coordinate; an image analyzing module 309 for analyzing the real-scene picture to identify a salient object in the real-scene picture; a marking module 311 for marking the identified salient object on the real-scene picture; and a sending module 312 for sending the real-scene picture on which the salient object and the target position are marked, in particular from the server to the passenger terminal and/or the travel service terminal.

The coordinate module 307 may be further configured for determining a geographic coordinate on the basis of the positioning information of the passenger terminal and/or the positioning information of the travel service terminal.

The sending module 311 may be further configured for sending the geographic coordinate, in particular from the server to the passenger terminal and/or the travel service terminal.

The various modules of which device 300 is comprised may be implemented in hardware or in software, depending on the determined implementation needs, as previously described.

Embodiments of the present subject matter further provide a travel service system, which comprises the device 300 for processing positioning information according to the present subject matter, wherein the device is connectable in communication to at least one passenger terminal 11 and at least one travel service terminal 12, and especially connectable in communication via a mobile wireless network.

It is feasible to analyze the real-scene picture in the map database according to the present subject matter, so as to obtain the salient object in the real-scene picture. This salient object may clearly provide the position information in a real environment. Therefore, the specifically marked salient object may serve as a reference for the pickup location, and the passenger and the driver of the travel service terminal may clearly know the salient object in the real-scene picture, and can easily find this object in the real environment. Therefore, according to the present subject matter, the position of the passenger's pickup location can be accurately marked, thereby the problems that the driver and the passenger formulate differently for the same location and the navigation positioning information is not accurate enough, can be resolved. Even if the passenger and the driver do not know how to describe their specific positions in a strange situation, both parties can also easily and accurately find the designated pickup location.

In addition, in the entire process no input of redundant information is necessary for both parties, thus the process is simple and efficient, thereby it can be avoided that excessive information may distract the driver and cause a safety hazard.

Figure 6:
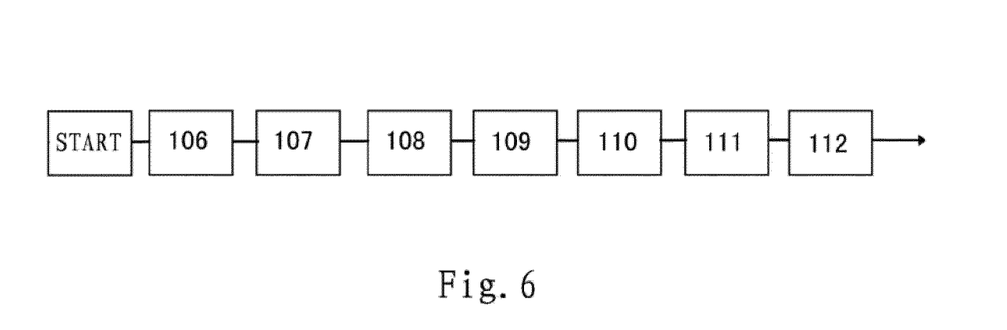
FIG. 6 is a schematic flow chart of another embodiment of a method and device for processing positioning information according to the present subject matter.

FIG. 6 shows a schematic flow chart of another embodiment of a method and a device for processing the positioning information according to the present subject matter. Here, the device 300 for processing the positioning information is integrated in the passenger terminal 11 or the smart communication tool. Correspondingly, the steps 106-112 of the method may be performed in the passenger terminal 11 or the smart communication tool. The start of the method may be implemented, for example, by operating an operating element on the passenger terminal, for example by clicking on an icon of an App. in the smartphone. The main difference from the previous embodiment will be mainly described herein, and the description of the previous embodiment may be referred to in other aspects.

In Step 106, the device 300 for processing the positioning information obtains a map database pre-stored in the passenger terminal 11. The map information includes real-scene picture information.

In Step 107, the passenger may determine a suitable pickup location by means of the device 300 for processing the positioning information or by means of the smart communication tool depending on the obtained map data, under consideration of the real-time positioning coordinate of the travel service terminal 12. The pickup location may be any one location between the passenger and the vehicle or nearby.

In Step 108, the passenger may obtain the real-scene picture information of the pickup location on the basis of the geographic coordinate of the pickup location determined In Step 107, in the map database containing the real-scene picture, by means of the device 300 for processing the positioning information.

In Step 109, the device 300 for processing the positioning information performs a salient area analysis of the real-scene picture of the pickup location obtained in Step 108, so as to identify the position and the area of the relatively salient object in the real-scene picture. The purpose of salient area analysis and target identification is to focus on those areas attracting visual attention so that an area of a relatively salient object in the picture may be obtained by analysis when the characteristics are extracted. The number of the identified salient objects might be one or more, and in some cases, one of the salient objects may be selected by the passenger by means of the device 300 for processing the positioning information.

In Step 110, the device 300 for processing the positioning information determines a target position on the basis of the identified salient object. It is also possible to determine a plurality of target positions and to select a target position from them by the passenger. As having already been mentioned previously, the target position may coincide with the position of the salient object, or there may be an azimuth deviation.

In Step 111, the device 300 for processing the positioning information marks, on the real-scene picture, the identified salient object and the area where the target position is situated.

In Step 112, the device 300 for processing the positioning information sends a real-scene picture 22 with the marked salient object and the marked target position to the travel service terminal 12. Such sending may be performed automatically after the real-scene picture 22 is generated, or may also be performed after the passenger confirms the sending.

Finally, it is to be noted that, the above-described embodiments are merely for understanding the present subject matter, but not constitute a limit to the protection scope of the present subject matter. For those skilled in the art, amendments may be made on the basis of the above-described embodiments, and all of these amendments do not depart from the protection scope of the present subject matter.

What is claimed is:

1. A method for processing positioning information performed in a travel service system comprising:
   obtaining map information including real-scene picture information;
   determining a geographic coordinate of a pickup location;
   obtaining a real-scene picture of the geographic coordinate, wherein
   the real-scene picture comprises a plurality of pixels;
   analyzing the real-scene picture to identify a salient object in the real-scene picture by:
      determining a color difference of a first pixel of the plurality of pixels with every other pixel of the plurality of pixels,
      dividing the real-scene picture into a plurality of areas, and
      determining a salient value for each area by the color difference weighted by the number of pixels in each of the areas, wherein
         the salient object is identified based on the determined salient values;
   marking the identified salient object on the real-scene picture; and
   sending the real-scene picture with the marked salient object to a receiving terminal.

2. The method according to claim 1, wherein
the receiving terminal is a passenger terminal or a travel service terminal; and
prior to the step of obtaining map information, including real-scene picture information, the method further comprising:
   receiving demand information and positioning information of the passenger terminal from the passenger terminal;
   matching the travel service terminal according to the positioning information of the passenger terminal;
   sending demand information of a user to the travel service terminal; and
   receiving confirmation information and positioning information of the travel service terminal from the travel service terminal.

3. The method according to claim 2, wherein
the demand information includes destination information.

4. The method according to claim 2, wherein
the step of determining the geographic coordinate further includes:
   determining the geographic coordinate based on the positioning information of the passenger terminal and/or the positioning information of the travel service terminal.

5. The method according to claim 1, wherein the method further comprises:
   sending the geographic coordinate to the receiving terminal.

6. The method according to claim 1, wherein the method further comprises:

determining a target position based on the identified salient object, wherein
the target position is the same as a position of the identified salient object or has a determined azimuth deviation from the position of the identified salient object;
in the presence of the azimuth deviation, the target position is marked on the real-scene picture in addition to marking the identified salient object on the real-scene picture; and
the real-scene picture with the marked identified salient object and with the marked target position is sent to the receiving terminal.

7. A data processing device, comprising:
a memory in which computer-executable instructions are stored; and
a processor in communication with the memory and configured to execute the computer-executable instructions to cause the data processing device to implement the method of claim 1.

8. A non-transitory computer-readable medium comprising instructions operable, when executed by one or more computing systems, to implement the method of claim 1.

9. A travel service system device for processing positioning information comprising:
a map module to obtain map information including real-scene picture information;
a coordinate module to determine a geographic coordinate of a pickup location;
a real-scene picture module to obtain information of a real-scene picture of the geographic coordinate, wherein the real-scene picture comprises a plurality of pixels;
an image analyzing module to analyze the real-scene picture to identify a salient object in the real-scene picture by:
determining a color difference of a first pixel of the plurality of pixels with every other pixel of the plurality of pixels;
dividing the real-scene picture into a plurality of areas, and
determining a salient value for each area by the color difference weighted by the number of pixels in each of the areas, wherein
the salient object is identified based on the determined salient values;
a marking module to mark the identified salient object on the real-scene picture; and
a sending module to send the real-scene picture with the marked salient object to a receiving terminal.

10. The travel service system device according to claim 9, wherein
the receiving terminal is a passenger terminal or a travel service terminal; and the travel service system device further comprises:
a passenger terminal information module to receive demand information and positioning information of the passenger terminal from the passenger terminal;
a matching module to match the travel service terminal according to the positioning information of the passenger terminal, and sending demand information of a user to the travel service terminal; and
a travel service terminal information module to receive confirmation information and positioning information of the travel service terminal from the travel service terminal.

11. The travel service system device according to claim 10, wherein
the demand information includes destination information.

12. The travel service system device according to claim 10, wherein the coordinate module is further configured to:
determine the geographic coordinate based on the positioning information of the passenger terminal and/or the positioning information of the travel service terminal.

13. The travel service system device according to claim 9, wherein the sending module is further configured to:
send the geographic coordinate to the receiving terminal.

14. The travel service system device according to claim 9, further comprising:
a target position determining module to determine a target position based on the identified salient object, wherein
the target position is the same as a position of the identified salient object or has a determined azimuth deviation from the position of the identified salient object;
the marking module is configured to mark the target position on the real-scene picture, in addition to marking the identified salient object on the real-scene picture, in the presence of the azimuth deviation; and
the real-scene picture with the marked identified salient object and with the marked target position is sent by the sending module.

15. A travel service system for processing positioning information comprising:
the travel service system device according to claim 9, wherein
the travel service system device is connectable in communication to at least one user terminal;
the travel service system device is connectable in communication to at least one passenger terminal and at least one travel service terminal; and
the travel service system device is connectable in communication via a mobile wireless network.

16. A method for processing positioning information performed in a travel service system comprising:
obtaining map information including real-scene picture information;
determining a geographic coordinate of a pickup location;
obtaining a real-scene picture of the geographic coordinate, wherein
the real-scene picture comprises a plurality of pixels;
analyzing the real-scene picture to identify a salient object in the real-scene picture by:
determining a color difference of a first pixel of the plurality of pixels with every other pixel of the plurality of pixels,
dividing the real-scene picture into a plurality of areas,
for each of the plurality of areas, generating a weighted undirected graph using each pixel of the plurality of pixels as a vertex and the color difference between each of the plurality of pixels as a weight of an edge, and
determining a salient value for each area by a spatial distance from all other areas, wherein
the salient object is identified based on the determined salient values;
marking the identified salient object on the real-scene picture; and
sending the real-scene picture with the marked salient object to a receiving terminal.

17. The method according to claim 16, wherein
the spatial distance is a Euclidean distance between centers of gravity of two areas.

18. The method according to claim 16, wherein
a maximum weight of a side connecting vertices within a same area is less than a minimum weight of a side connecting vertices of different areas.

* * * * *